United States Patent
Davis et al.

(10) Patent No.: US 7,324,231 B2
(45) Date of Patent: Jan. 29, 2008

(54) PRINTER EXPANSION METHOD AND APPARATUS

(75) Inventors: Brett L. Davis, Boise, ID (US); Daniel J. Martin, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 770 days.

(21) Appl. No.: 10/310,328

(22) Filed: Dec. 5, 2002

(65) Prior Publication Data

US 2004/0109195 A1 Jun. 10, 2004

(51) Int. Cl.
*G06F 13/00* (2006.01)
*G06F 3/12* (2006.01)

(52) U.S. Cl. .................. 358/1.15; 710/300; 710/306

(58) Field of Classification Search ......... 710/8–11, 710/300, 305–306, 311–315; 358/1.1, 1.15
See application file for complete search history.

(56) References Cited

U.S. PATENT DOCUMENTS

| | | | | |
|---|---|---|---|---|
| 5,809,278 A | * | 9/1998 | Watanabe et al. | 711/150 |
| 5,951,667 A | | 9/1999 | Abramson | 710/129 |
| 6,078,402 A | | 6/2000 | Fischer et al. | 358/1.16 |
| 6,108,100 A | | 8/2000 | McVey et al. | 358/1.16 |
| 6,141,708 A | * | 10/2000 | Tavallaei et al. | 710/62 |
| 6,233,641 B1 | | 5/2001 | Graham et al. | 710/131 |
| 6,308,234 B1 | | 10/2001 | Davies et al. | 710/104 |
| 6,370,593 B1 | | 4/2002 | Larson | 710/1 |
| 6,748,478 B1 | * | 6/2004 | Burke et al. | 710/312 |
| 6,996,656 B2 | * | 2/2006 | Burton | 710/309 |
| 2002/0073249 A1 | * | 6/2002 | French et al. | 710/8 |

OTHER PUBLICATIONS

"Introduction to Algorithms". Authored by Thomas H Cormen, Charles E Leiserson, and Ronald L Rivest. Copyrigh 1990 by the Massachusetts Institute of Technology. pp. 477-481.*
"21555 Non-Transparent PCI-to-PCI Bridge", Intel User Manual, Jul. 2001, pp. 1-198.

* cited by examiner

*Primary Examiner*—Thomas D. Lee (57) ABSTRACT

The present invention is a computing system typically but not necessarily used in a printer, which includes a processor for managing operation of a print engine, expansion buses, and bridge devices between expansion buses. A bus bridge is described which can operate in an expansion bus environment. The bus bridge uses a nontransparent PCI bridge in a nonstandard manner to emulate a transparent bus bridge. Processes are included for detecting overall bus topology in the system and for creating configuration cycles on the secondary side of any bridge found.

16 Claims, 6 Drawing Sheets

PRINTER EXPANSION METHOD AND APPARATUS

BACKGROUND OF THE INVENTION

1. Field of the Invention

The present invention relates generally to facsimile and static presentation processing and, more particularly, to methods of expanding capabilities of printers and devices with printing capabilities through use of an expansion bus.

2. State of the Art

Computer systems generally include expansion buses for adding functional enhancements to basic computer systems. As technology improves, computer expansion buses evolve, and in recent years, the Peripheral Component Interface (PCI) bus has become a widely used standard bus on many personal computers. The use of a widely accepted expansion bus, such as PCI, allows production of platform computers and expansion cards by a large number of diverse vendors in an environment where the probability is very high that various expansion cards will operate properly in a variety of platform computer systems. PCI has become such an accepted standard that its use has expanded to many embedded computing applications, particularly where there is a desire for peripheral expansion options.

Peripheral devices, such as printers, are becoming increasingly complex. Indeed, many are completely embedded computing environments, themselves containing microprocessors, random access memory (RAM), read only memory (ROM), and expansion buses for peripherals. The PCI bus is a reasonable expansion bus selection for many of these peripheral devices; however, the PCI bus also exhibits shortcomings for such applications. Because the PCI bus architecture is primarily for the personal computer market, it must remain extremely flexible, whereas in an embedded system environment, some of the complexities accompanying that flexibility are not needed and sometimes not desired.

To overcome these drawbacks, many embedded systems use a derivative of the PCI bus more suited to the required application. Hewlett Packard, for instance, uses a derivative of the PCI bus termed the "Enhanced Input/Output (EIO) bus." The EIO bus reduces some of the complexity of the PCI bus by limiting some of its capabilities while retaining a large collection of available peripheral devices that will operate correctly on the EIO bus.

Returning to a general purpose computing system, such as a personal computer (PC), the PCI standard also contains a definition of a PCI-to-PCI bridge. A PCI-to PCI-bridge connects a "primary" PCI bus, which is closest to the main processor, to a "secondary" PCI bus. The addition of a PCI bridge allows for increasing the number of available expansion slots in a PC as well as providing some electrical and functional isolation for those devices residing on the secondary PCI bus. Additionally, expansion bus bridges allow for other enhancements. A peripheral may implement an alternate bus architecture such as the legacy PC Industry Standard Architecture bus, or an alternative proprietary bus on the secondary side of the bridge. In addition, for complex expansion devices, the secondary side may function as its own computing environment with its own processor and memory organization while still allowing access to the expansion device by the host processor on the primary side of the expansion bus.

In a printer environment using an EIO bus as the expansion bus, the PCI-to-PCI bridge architecture as defined is not completely suitable or practical. There is, however, still a need for increasing the number and type of expansion devices attachable in an embedded computing environment such as a printer. For example, even in high-end printers, only two or three EIO expansion ports are available. This can be limiting if a printer user would like to add numerous additional capabilities to the printer.

For these reasons, a bridge architecture is needed for expansion buses including the EIO bus. The need exists to increase expansion bus capabilities by allowing additional devices and potentially more complex devices in an embedded system environment. Additionally, the need exists to increase retrofit expansion capability by facilitating the addition of peripheral devices such as a second hard disk drive, a network card, a second network card, an IEEE 1394 high-speed serial bus card, and removable media storage devices.

BRIEF SUMMARY OF THE INVENTION

In one embodiment, the present invention comprises a computing system, which includes a processor for managing operation of a print engine, expansion buses, bridge devices between expansion buses, communication ports, and an optional scan engine. Also included within an embodiment of the present invention is the software required to control the bridge devices.

The bus bridge device in a preferred embodiment provides bridging between buses including EIO buses, as well as other PCI derivative buses. The present invention overcomes the limitation on configuration cycle generation in EIO controllers by using a nontransparent bridge. A nontransparent bridge prefers an intelligent controller on the secondary side to configure peripheral devices on this secondary bus. As a result, to emulate a transparent bridge, the nontransparent bridge must be configured and used in a nonstandard way. To accomplish this, the present invention creates a method for generating secondary expansion configuration cycles from software programming of certain internal registers of the nontransparent bridge device.

The present invention addresses an additional complication when using a nontransparent bridge to emulate a transparent bridge, namely, the ability to store overall bus topologies. Much of the forwarding of configuration bus cycles from a top-level bus (i.e., closer to the processor) to the lower-level buses behind the bridge are handled by the bridge device. In the present invention, the bus topology discovery process and configuration setup of peripheral devices on branch levels of the hierarchy are managed by software.

An EIO bridge card provides expansion for the printer by facilitating more capabilities through the addition of at least three additional expansion slots for each bridge card used in a system. The present invention allows multiple bridge cards on any hierarchy level as well as building three or more levels of hierarchy. Additionally, a bridge card may be inserted in any expansion slot on any of the hierarchy levels.

Turning to the software portions of the present invention, there are two areas for the software to address. First is a method for creating configuration cycles on the secondary side of any bus bridge in the system. Second is a method for discovering the overall bus topology of the system. These two areas are actually used in combination in the sense that the configuration cycle generation discovers the bus topology, and at the same time, some knowledge of the bus topology generates proper configuration cycles.

During initialization, software performs the process of discovering the overall topology of the system's expansion buses as well as which devices are connected to those buses.

A heuristic process is used to discover devices connected to a bus, as well as whether any of the discovered devices are bus bridges. If a bridge is discovered, the software can traverse through the bridge to the secondary side to discover and initialize any peripherals on that next level in the bus hierarchy. However, the method does not poll every slot at a given hierarchy level before examining other bus levels. Rather, as soon as software discovers a bus bridge, it will traverse down to the next level of bus hierarchy and begin searching that level. Only after searching out everything on the current branch of the hierarchy (i.e., this level and anything lower if another bridge is found) will the software return to the primary side of the bridge and finish searching for other devices on the hierarchy level attached to the primary side. Using this method, the software eventually walks through each available slot to discover all connected peripheral devices at all bus levels.

Generating configuration cycles on the different levels of expansion buses is also performed by software in the preferred embodiment. For devices on the bus level closest to the processor, configuration cycles follow a standard PCI protocol. However, because the present invention uses a nontransparent bus bridge, configuration cycles on lower levels of the hierarchy are software managed.

If a peripheral device is on an expansion bus level one-removed from the primary EIO bus, a level of indirection is required to generate proper configuration cycles. This indirection is accomplished using configuration control registers within the bus bridge. An address register holds the configuration address to be used when a configuration cycle is generated on the secondary bus of the bridge. A control register defines whether secondary configuration bus cycles may occur and whether the generated secondary bus cycles may address configuration registers within the bus bridge itself. Any access (read or write) to a configuration data register in the bus bridge will, if enabled, trigger the configuration bus cycle to occur on the secondary bus. Specifics on the process of setting up the registers, particularly for the different levels of indirection, are described in the detailed description section below.

BRIEF DESCRIPTION OF THE SEVERAL VIEWS OF THE DRAWINGS

In the drawings, which illustrate what is currently considered to be the best mode for carrying out the invention.

DETAILED DESCRIPTION OF THE INVENTION

Although an EIO bus is similar to a PCI bus, some operations are not supported. One of the PCI operations not present in a typical EIO controller is the ability to generate type 1 configuration cycles. In a standard PCI system, expansion devices are configured at power-up time by addressing the devices with special configuration cycles. A configuration cycle destined for an expansion device on the primary PCI bus is addressed with a type 0 PCI configuration cycle. This includes the configuration of a PCI-to-PCI bridge on the primary expansion bus. To configure devices on a secondary PCI bus, a PCI bus controller generates a type 1 PCI configuration cycle. The type 1 PCI configuration cycle is claimed by the PCI-to-PCI bridge and forwarded on to the secondary PCI bus. When the configuration cycle is forwarded on to the secondary PCI bus, the bridge either retains the configuration cycle as a type 1 cycle or translates it to a type 0 configuration cycle.

Typical PCI-to-PCI bus bridges are generally called "transparent bridges," in that bus cycles are passed among the primary and secondary buses with little intelligent intervention. However, with the inability of a typical EIO controller to generate type 1 configuration cycles, there is no way for a conventional PCI-to-PCI bus bridge used in an EIO system to generate configuration cycles on a secondary bus and, thus, configure any devices attached to the secondary bus. To solve this problem, the present invention creates a method for generating secondary expansion bus (also referred to as secondary EIO bus) type 0 configuration cycles based on a type 0 configuration cycle on the primary expansion bus (also referred to as primary EIO bus).

There is a second type of PCI-to-PCI bridge device commercially available, typically called "nontransparent bridges." The Intel 21555 nontransparent PCI-to-PCI bridge is an example of such a device. These nontransparent bridges are generally used in systems that have an intelligent controller on the secondary bus side (local processor), as well as the host processor on the primary bus side. In this configuration, the local processor on the secondary bus side generates the configuration cycles for all devices on the secondary bus. Thus, these nontransparent bridges are not required to, and in fact usually do not, respond to type 1 configuration cycles generated by the host processor on the primary bus. They do, however, have a mechanism, through internal programmable registers, for creating a type 0 configuration cycle on the secondary bus. This requires a software solution for the configuration bus cycle forwarding across bus bridges, which was handled by hardware in a typical PCI-to-PCI bus bridge. The use of this mechanism in a nonstandard PCI expansion bus system is described further in the software description below.

The use of a nontransparent bridge, intended to appear as a transparent bridge without a local processor, in an EIO system unfortunately generates additional complications. A new method is required to program configuration registers on the secondary side, which would normally be programmed by a local processor. To accomplish this, the input signal SIDSEL on the secondary bus identifies a device as a target of a type 0 configuration cycle. With this mechanism, one can program the nontransparent bridge to generate a type 0 configuration cycle on the secondary bus with an address location that will, in effect, address the configuration registers within the bridge chip on the secondary side.

An additional complication created by using a nontransparent bridge to emulate a transparent bridge is the ability to store overall bus topologies. More than one bridge may be used in a system, creating a hierarchy of buses. To define the bus topology, the buses are given a number with level zero being the bus closest to the processor. A first bus bridge, therefore, connects level zero on the primary side of the bridge to level one on the secondary side of the bridge. A second bus bridge may connect to level one on the primary side and create a level two bus on the secondary side of the second bus bridge, and so forth. In transparent bridge operation, storage locations are reserved in the bridge device defining this topology so the hardware can forward configuration cycles to the proper bus. The software programs these storage locations as it discovers the overall bus topology. Unfortunately, a nontransparent bridge device does not contain these storage locations. As a result, software must create a mechanism to retain the information of the overall bus topology as it is discovered. This mechanism in a nonstandard PCI expansion bus system is described further in the software description below.

Hardware Description

Figure 1:
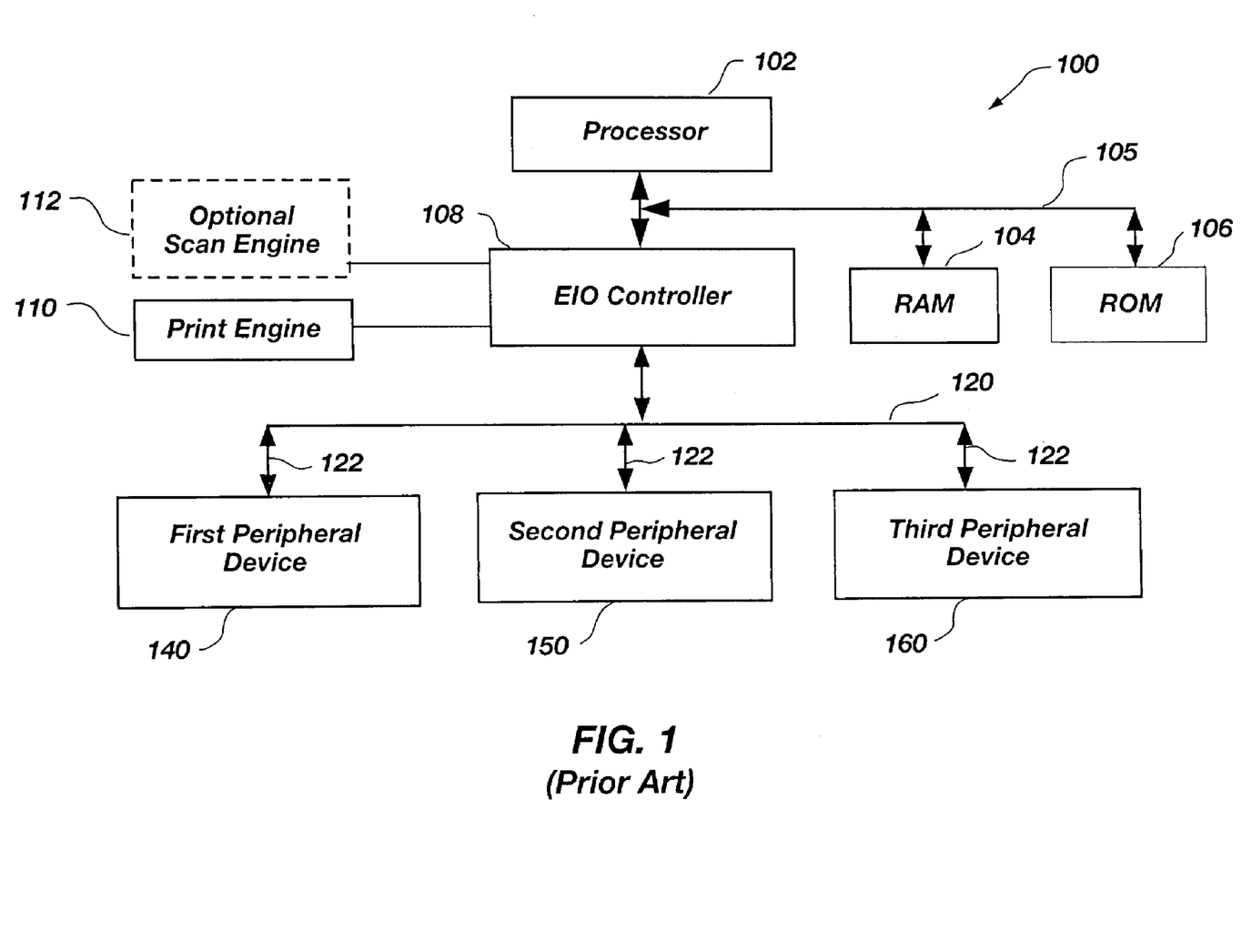
FIG. 1 is a block diagram of a printer with expansion buses.

Referring to FIG. 1, a basic block diagram of a typical computing system 100 is shown. Although the computing system 100 is generally shown as a laser printer, the presently preferred embodiment is not limited to laser printers, as it may equally apply to inkjet, thermal, and impact printers. It is equally applicable to multipurpose devices, which may combine the printing operation with other imaging operations such as copying, FAXing, and scanning of images or documents. Also within the scope of the present invention are other computing environments using a nonstandard PCI bus expansion system.

The computing system 100, as shown in FIG. 1, includes a processor 102 for managing operation of a print engine 110, an optional scan engine 112, and an expansion bus controller 108, also referred to as an EIO controller. Also connected to the processor 102 are a random access memory (RAM) 104 and a read only memory (ROM) 106.

The print engine 110 may be any of those well known in the art capable of accepting rasterized images and producing a hard copy print, such as laser, ink jet, impact, and thermal printers. Similarly, the optional scan engine 112 is one that is well known in the art capable of delivering a rasterized data stream from a scanned hard copy of a document or image. The processor 102 may be any microcontroller, microprocessor, or application-specific device capable of managing the control and data movements required for typical general computing operations.

Figure 2:
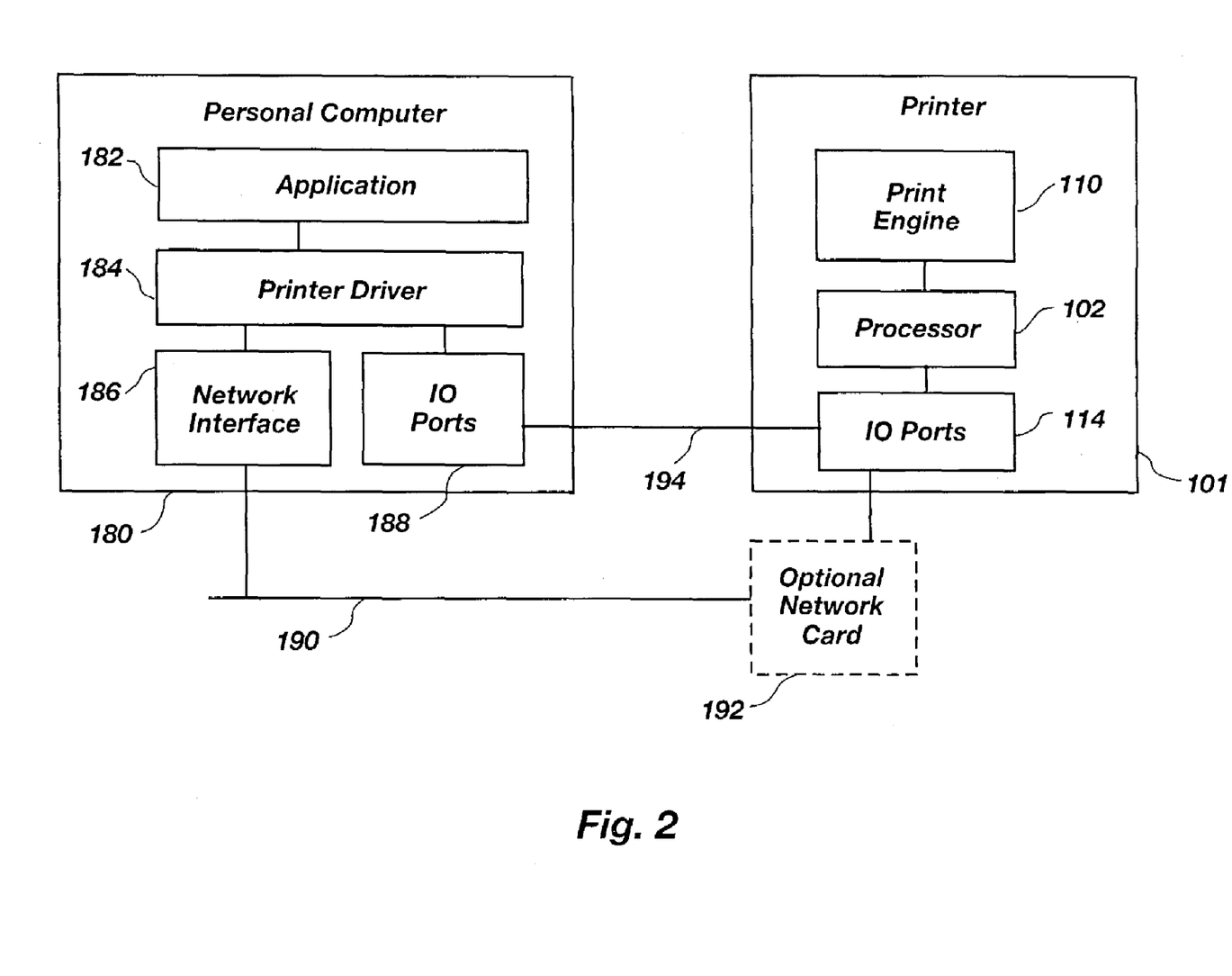
FIG. 2 is a block diagram of a printer coupled with a personal computer in accordance with an embodiment of the present invention.

The ROM 106 stores executable firmware code for the processor 102 as well as code for multiple interpreters capable of handling different types of print jobs. These interpreters decode and translate print languages such as Printer Command Language (PCL) and PostScript® to prepare the print data for the print engine 110. The ROM 106 may also contain font tables for producing certain fonts more easily, quickly, and without assistance from an external source document generator, such as, for example a PC 180 (FIG. 2). Although the ROM 106 element is referred to as a read only memory, it is understood that any nonvolatile memory such as electrically erasable programmable memory or flash memory is within the scope of the present invention. Indeed, for most applications, flash memory may be preferable because it allows downloading updates of the executable firmware code from a PC or other image-generating device.

The RAM 104 stores temporary data generated by firmware code, buffers print data, and performs various other data storage activities. The RAM 104 is particularly useful where a lower latency access time to the data is required than can be provided by ROM 106 or disk drives.

Among other operations (not described), the EIO controller 108 receives memory and IO bus cycles from the processor bus 105, which are not destined for other devices on the processor bus 105 such as RAM 104 and ROM 106, and generates EIO-type bus cycles on the first level expansion bus 120, also referred to as the first level EIO bus. A typical computing system 100 may have from one to three first level EIO bus connectors 122. Any of these connectors may be populated with peripheral devices such as network cards, hard disk drives, and high-speed serial bus cards. These peripheral devices are shown as a first peripheral device 140, a second peripheral device 150, and a third peripheral device 160.

In a system, as shown in FIG. 2, the printer 101 typically attaches to a source document generator such as a PC 180. This connection may be directly through one of the IO ports 114, or interfaced through a network 190. In the case of a network connection, a software application 182 executing on the PC 180 generates print data and print commands, then typically sends them to printer driver software 184. The printer driver software 184 processes and sends the data to network interface hardware 186, which in turn places the print data and commands on the network 190. A network card 192 receives the data from the network 190 and passes it through one of the IO ports 114. This network card 192 is built into the printer or optionally added as an external device.

In the case of a direct connection, the printer driver software 184 sends the data to an IO port 188 on the PC 180 rather than the network interface hardware 186. An IO bus connection 194 provides communication between the PC 180 and the printer's IO port 114. This connection is typically a standard parallel printer IO port, or a serial IO port, such as, for example, an RS-232 port or USB port.

For clarity, FIG. 2 depicts the source document generator as a PC 180; however, this device may be any device capable of forming an image and sending the image data to the printer 101 such as a PDA, digital camera, intelligent cellular phone, or other specialized hardware.

Figure 3:
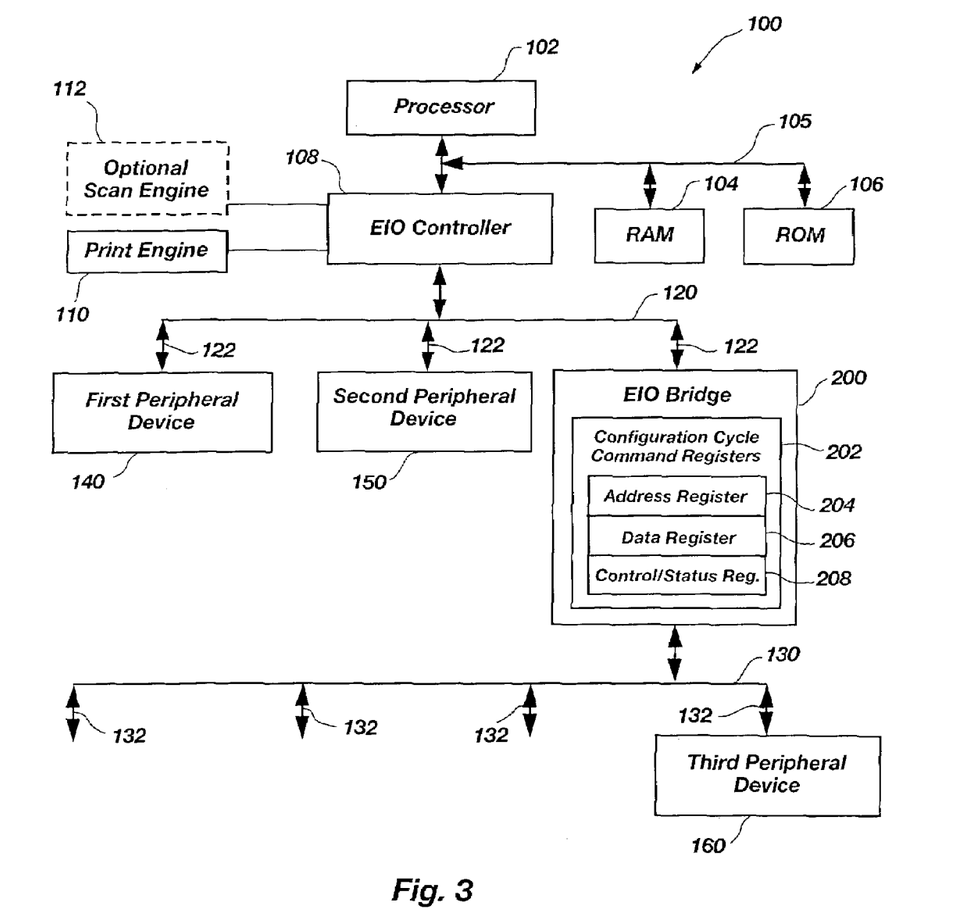
FIG. 3 is a block diagram of a system with an expansion bus bridge in accordance with an embodiment of the present invention.

As can be seen from FIG. 1, with three peripheral devices attached to the first level EIO bus 120, the computing system 100 is no longer capable of further expansion. The present invention eliminates this problem using an expansion bus bridge 200, also referred to as an EIO bridge, inserted into one of the first level EIO bus connectors 122 as shown in FIG. 3. While shown in the rightmost first level EIO bus connector 122, the EIO bridge 200 may be inserted into any of the first level EIO bus connectors 122. The addition of the EIO bridge 200 creates a second level expansion bus 130, also referred to as a second level EIO bus, with up to four second level bus connectors 132, also referred to as EIO bus connectors. Obviously, with the EIO bridge 200 occupying one of the first level EIO bus connectors 122, the third peripheral device 160 must be moved to one of the second level EIO bus connectors 132.

Figure 4:
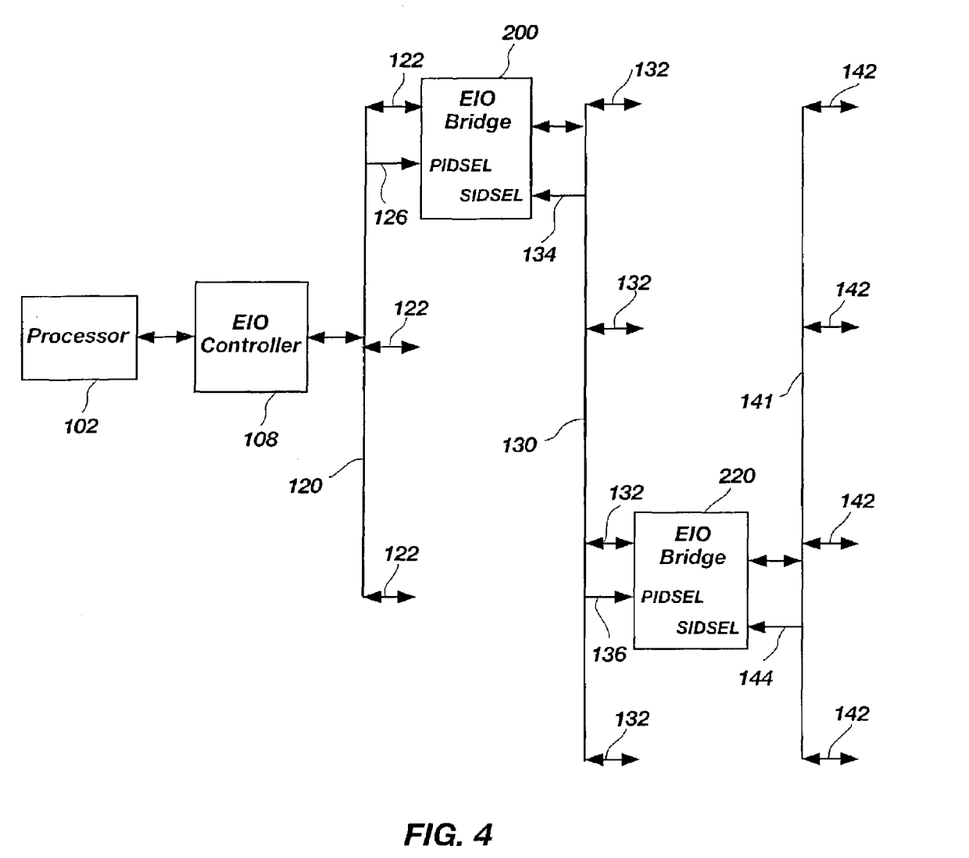
FIG. 4 is a block diagram of a system with multiple expansion bus bridges and three levels of expansion buses in accordance with an embodiment of the present invention.

FIG. 4 illustrates further expansion capabilities. In FIG. 4, a second expansion bus bridge 220, also referred to as a second EIO bridge, connects the second level expansion bus 130 to a third level expansion bus 141 with up to four third level bus connectors 142. Also shown in FIG. 4 are two key signals for the control of configuration cycle addressing in the first expansion bus bridge 200 and the second expansion bus bridge 220. These signals are primary side ID select (PIDSEL) and secondary side ID select (SIDSEL). These signals are used as a part of the addressing mechanism for configuration cycles. When the PIDSEL or SIDSEL signal is asserted, the bus bridge responds to the configuration cycle on the corresponding bus. Typically in PCI and EIO, each expansion bus slot is assigned to a different and specific address bit of the upper address bits on the PCI bus. For example, slot one PIDSEL is connected to address bit 16, slot two PIDSEL is connected to address bit 17, and so forth. On the secondary bus side, for example, the SIDSEL signal of the bus bridge may be connected to address bit 16, slot one connected to address bit 17, slot two to address bit 18, and so forth. Accordingly, under this addressing scheme, with the first expansion bus bridge 200 inserted in the first level EIO bus connector 122 of the first level expansion bus 120, the PIDSEL pin would be connected to address bit 16 of the first level expansion bus 126. The SIDSEL pin is connected to address bit 16 of the second level expansion bus 134. Similarly, for the second expansion bus bridge 220 inserted in second level EIO bus connector 132 of the second level expansion bus 130, the PIDSEL pin would be connected to address bit 19 of the second level expansion bus 136. The SIDSEL pin is connected to address bit 16 of the third level expansion bus 144. These connections are examples only, and many other configurations are possible within the scope of the present invention.

Returning to FIG. 3, the bus bridge also contains key command registers 202 for controlling and generating configuration bus cycles on the secondary bus. These registers are an address register 204, a data register 206, and a control and status register 208. The function of these registers is described in detail in the software description section below.

Software Description

Figure 5:
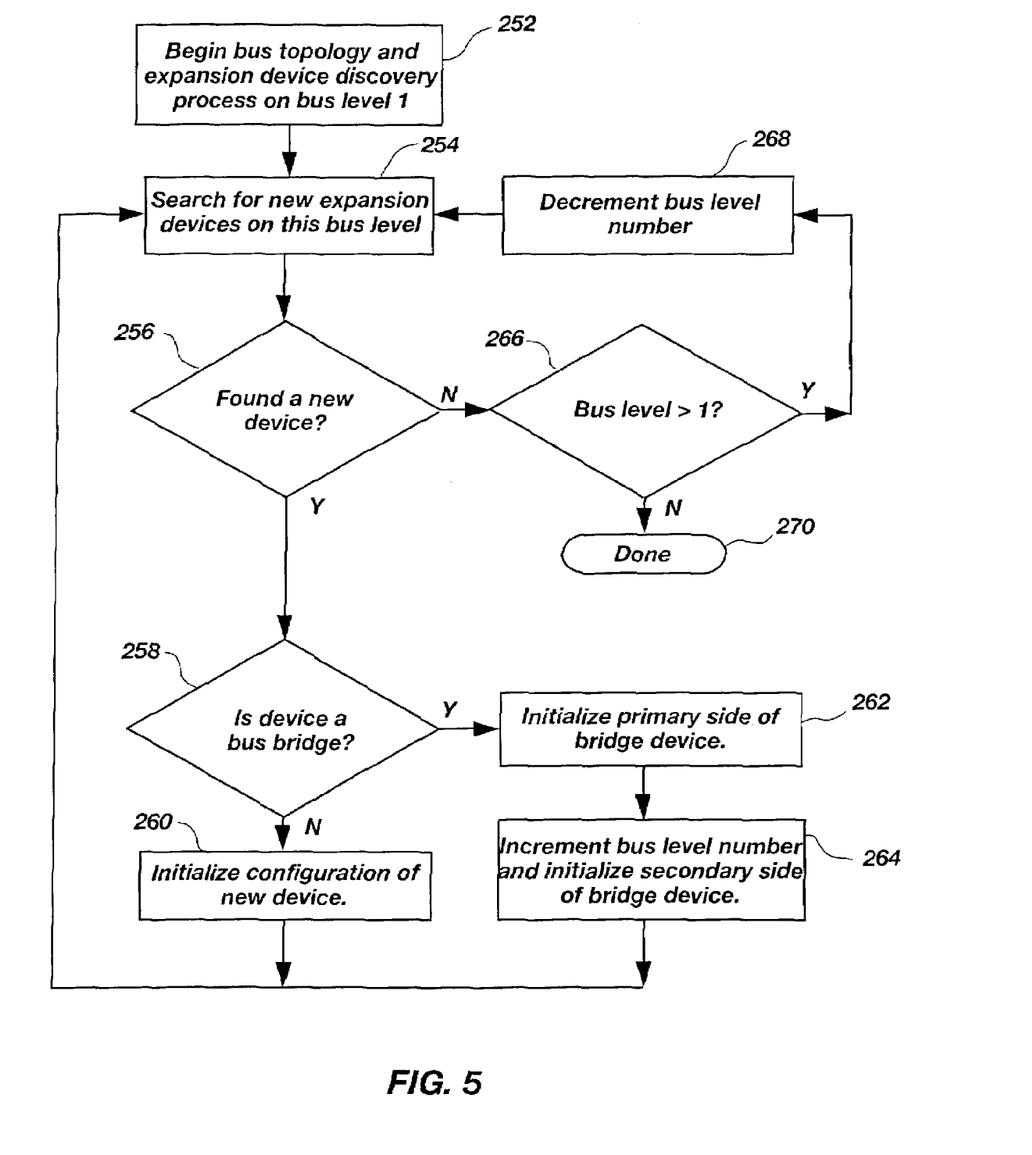
FIG. 5 is a flow diagram of a bus topology and expansion device discovery process in accordance with an embodiment of the present invention.

FIG. 5 illustrates the process of discovering the overall topology of the expansion buses within the system and the devices connected to those buses. During the initial configuration of a system with expansion buses, software must use a heuristic process to discover which devices are connected to an expansion bus. If one of those devices is a bus bridge, the software must also determine what devices are on the secondary side of the bus bridge.

In a step 252, the software begins the process by defining a software counter to keep track of the bus level being explored and sets the bus level to one, defined as the expansion bus closest to the processor 102. Then, it begins searching for expansion devices connected to the current bus level 254. To discover expansion devices, the software issues configuration read cycles to an address associated with each expansion slot using the PIDSEL and SIDSEL mechanisms described above on the hardware description section. This may be done to any configuration register defined as mandatory within a PCI-compatible expansion device, but typically the software reads the class code register to also discover the class of a device connected to that particular expansion slot. If there is a response to this cycle, a new device has been discovered in a query step 256. When a new device is discovered in a step 256, software determines in a step 258 if the device is a bus bridge. A bus bridge will have a value of 06 h (06 hexadecimal) in the class code register as defined by the PCI bus specification. If the device is not a bus bridge in query step 258, software will then initialize the configuration of the detected device in a step 260. This is a device-specific process using routines provided within the software driver for the device. After configuration of the device in a step 260, software returns to the search for a new expansion device in a step 254.

With the expansion device search loop beginning again in a step 254, if the software finds a device in another expansion slot in a query step 256, it will again determine if the device is a bus bridge in a step 258. If the device is a bus bridge, the software initializes the configuration of the primary side of the bus bridge in a step 262. After the primary side of the bus bridge is initialized, the software increments the bus level pointer by one and initializes the secondary side of the bus bridge in a step 264. By incrementing the bus level pointer, the software is now attempting to find and configure devices on the next level of the bus hierarchy. Under this scheme, the secondary side of the bus bridge is considered to be on the next bus level. For example, if the primary side of a bus bridge is found on bus level zero, the bus level number is incremented to one and the secondary side of the bus bridge is considered to be on bus level one.

After initialization of the secondary side of the bus bridge in step 264, the software returns to the top of the search loop, and begins a search for expansion devices on this new bus level in step 254. If the software finds a new device in a step 256 and determines that it is not a bus bridge in step 258, it will then initialize the new device in step 260 and return to step 254.

By way of example, on a subsequent traversal, when the process does not find any more devices at the current bus level in query step 256, that means it has discovered all the devices at this level of the bus hierarchy. The process then determines if the current bus level pointer is equal to one in a step 266. When the current bus level is greater than one, the search process resumes and decrements the bus level pointer in a step 268 (i.e., points to a bus level closer to the trunk of the hierarchy) and returns to step 254. Processing continues and, for example, if no more devices are at the current bus level as determined in a step 256, a check is made to see if the bus level pointer is greater than one in a step 266. If it is not, the bus and device discovery process is complete at step 270. This process of the present invention allows for a search through multiple levels of bus hierarchy and discovery of all devices connected at all levels of the hierarchy without any initial knowledge of if or where any peripheral or bus bridge devices are connected.

Figure 6:
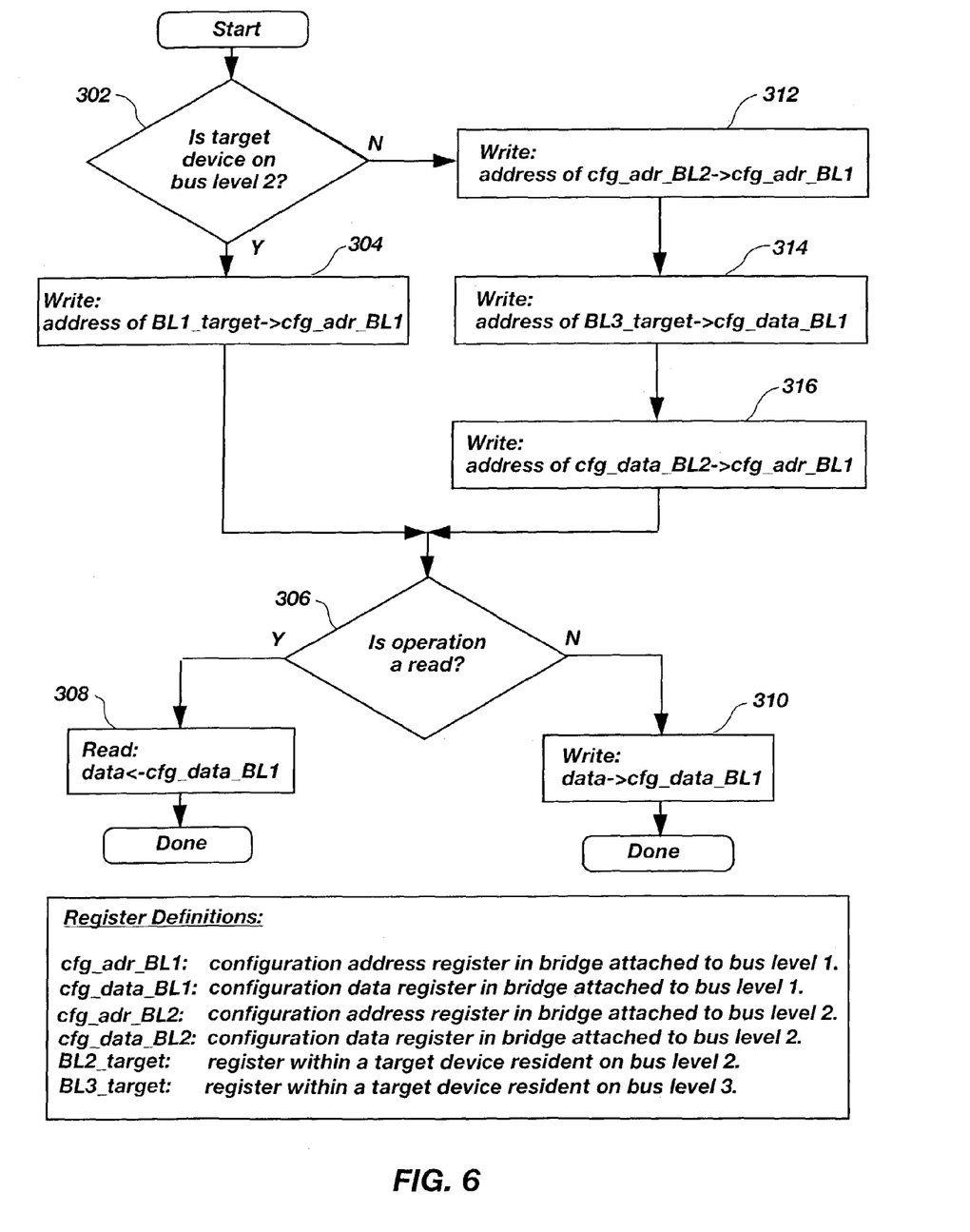
FIG. 6 is a flow diagram of a process for writing to configuration registers on a secondary side of expansion bus bridges in accordance with an embodiment of the present invention.

FIG. 6 illustrates the process of generating configuration cycles on the different levels of expansion buses. In a standard, nontransparent PCI system, configuration read and write cycles are relatively transparent for the process. The process needs to know whether the device with the configuration register to be addressed is on bus level one or somewhere down in the hierarchy. If the device is at bus level one, a type 0 configuration cycle is generated. If the device is at any other level, a type 1 configuration cycle containing the destination bus number is generated. The appropriate bus bridge in the system then claims the bus cycle and, if it is a type 1 cycle, forwards the cycle on to its secondary side. In systems using a derivative of the PCI bus, the hardware bus controllers and bus bridges may not be capable of generating a type 1 configuration cycle. The present invention overcomes this hurdle by using a nontransparent bus bridge and additional management of the configuration cycles by software emulating transparent bus bridge operation.

For devices on bus level one, including the primary side of a bus bridge connected to bus level one, normal type 0 configuration read and write operations work in a PCI fashion. For devices deeper in the bus hierarchy, the process of FIG. 6 intervenes. First, in a step 302, a determination is made if the target device (i.e., the device containing the configuration register to be addressed) is on bus level two. If so, there is a level of indirection required in generating the proper configuration cycle. In a step 304, software writes to a configuration address register within the bus bridge attached to bus level one. The value written into this configuration address register should be the address value to appear on the secondary bus (bus level 2) when the configuration bus cycle is initiated. Next, in a step 306, software determines whether a read operation or write operation is desired. If a write operation is desired, the process then writes to a configuration data register within the bus bridge attached to bus level one in a step 310. The value written into this register should be the data value to appear on the secondary bus when the configuration bus cycle is initiated. Completion of a write to this configuration data register triggers a configuration write cycle to issue from the secondary side of the bus bridge to the address contained in the configuration address register with the data contained in the configuration data register.

On the other hand in a step 306, if the operation is a read, the process in a step 308 reads the configuration data register within the bus bridge attached to bus level one. The configuration read to the configuration data register triggers a configuration read cycle to issue from the secondary side of the bus bridge to the address contained in the configuration address register. When the configuration data returns from the addressed device, it is placed in the configuration data register of the bus bridge. This in turn triggers a bus cycle on the primary side of the bus bridge for returning the data to the bus controller and ultimately the processor.

When the target device is not on bus level two as determined in step 302 (i.e., on bus level three), the process is different because there are two levels of indirection. First, the software must get the configuration address of the target device residing on bus level three into the configuration address register of the second bus bridge with its primary side on bus level two. To do this, the software first writes the address of the configuration register in the bus level one bridge device in a step 312. Next, software writes the address of the target device on bus level three into the configuration data register of the bus level one bridge device in a step 314. This triggers a configuration write cycle on bus level two storing the address of the target device in the configuration address register of the bus level two bridge. Second, software writes the address of the configuration data register in the bus level two bridge device into the configuration address register of the bus level one device in a step 316. At this point, the chain is set up to accomplish the actual target register read or write.

If a write operation is to be performed in a step 306, the data to be stored is written in the target register of the configuration data register of the bus level one bridge in a step 310. This triggers a configuration write cycle on bus level two to the configuration data register of the bus level two bridge using the data in the configuration data register of the bus level one bridge. This in turn triggers a configuration write cycle on bus level three to the address of the target device with the data from the configuration data register of the bus level two bridge.

On the other hand, if the desired operation is a read as determined in step 306, a configuration read to the configuration data register of the bus level one bridge is initiated. This triggers a configuration read on bus level two to the configuration data register of the bus level two bridge. This in turn triggers a configuration read on bus level three to the target device. When the target device responds with the read data, it is stored in the configuration data register of the bus level two bridge. This storage triggers a read response cycle on bus level two using the data in the configuration data register of the bus level two bridge. The read response cycle on bus level two stores the supplied data in the configuration data register of the bus level one bridge. This storage triggers a read response cycle on bus level one using the data in the configuration data register of the bus level one bridge to the main bus controller and, in turn, to the processor.

While not shown in FIG. 6, yet within the scope of the present invention, the process easily expands, allowing more levels of hierarchy and more than one bus bridge at any given level of the hierarchy. The software including methods and processes of the present invention operate in conjunction with hardware and may be stored in a computer-readable media such as a floppy disk, CDROM, or other devices used for data storage including programmable hardware. However, the software may also be obtainable, and, as a result, an element of the claimed invention, from on-line communication sources such as internet download sites.

Specific embodiments have been shown by way of example in the drawings and have been described in detail herein; however, the invention may be susceptible to various modifications and alternative forms. It should be understood that the invention is not intended to be limited to the particular forms disclosed. Rather, the invention includes all modifications, equivalents, and alternatives falling within the spirit and scope of the invention as defined by the following appended claims.

What is claimed is:

1. A printer, comprising:
    a processor;
    a print engine operably coupled to and controlled by the processor for receiving print operations from the processor;
    more than three expansion ports;
    a first level expansion bus operably coupled to the processor, the first level expansion bus comprising an Enhanced Input/Output (EIO) bus;
    an expansion bus controller operably coupled to the processor and generating EIO bus cycles on the first level expansion bus;
    a second level expansion bus; and
    a first nontransparent expansion bus bridge operably coupled to the first level expansion bus and the second level expansion bus, the first nontransparent expansion bus bridge configured to emulate a transparent bridge and comprising:
        a first plurality of command registers; and
        a set of executable instructions for execution by the processor, wherein the set of executable instructions controls the first plurality of command registers to generate a secondary expansion bus configuration cycle emulating a transparent expansion bus configuration cycle on the second level expansion bus prior to completing a search for peripheral devices on the first level expansion bus.

2. The printer of claim 1 wherein the secondary expansion bus configuration cycle addresses a first configuration register on the second level expansion bus.

3. The printer of claim 2 wherein the first configuration register on the second level expansion bus is located within the first expansion bus bridge.

4. The printer of claim 2, wherein the first plurality of command registers comprises:
    a first address register for holding an address for use in the secondary expansion bus configuration cycle;
    a first data register for holding a data value and initiating the secondary expansion bus configuration cycle when the first data register is accessed; and a first control and status register for enabling the secondary expansion bus configuration cycle.

5. The printer of claim 4, further comprising:
a third level expansion bus; and
a second expansion bus bridge operably coupled to the second level expansion bus and the third level expansion bus, comprising:
a second plurality of command registers; and
wherein the set of executable instructions additionally controls the second plurality of command registers to generate the secondary expansion bus configuration cycles emulating transparent expansion bus configuration cycles on the third level expansion bus.

6. The printer of claim 5 wherein the secondary expansion bus configuration cycle addresses a second configuration register on the third level expansion bus.

7. The printer of claim 6 wherein the second configuration register on the third level expansion bus is located within the second expansion bus bridge.

8. The printer of claim 5, further comprising at least one peripheral device operably coupled to the third level expansion bus.

9. The printer of claim 5, further comprising a scan engine operably coupled to and controlled by the processor for delivering scan data to the processor.

10. The printer of claim 5, wherein the second plurality of command registers comprises:
a second address register for holding an address for use in the secondary expansion bus configuration cycle;
a second data register for holding a data value and initiating the secondary expansion bus configuration cycle when the second data register is accessed; and
a second control and status register for enabling the secondary expansion bus configuration cycle.

11. The printer of claim 1, further comprising:
at least one peripheral device operably coupled to the first level expansion bus; and
at least one additional peripheral device operably coupled to the second level expansion bus.

12. The printer of claim 1, further comprising a scan engine operably coupled to and controlled by the processor for delivering scan data to the processor.

13. A method for discovering expansion bus topology in a printer, comprising:
generating a set of first level configuration cycles on a first level plurality of expansion bus slots of a first level Enhanced Input/Output (EIO) expansion bus of the printer, the plurality of expansion bus slots being greater than three;
using the set of first level configuration cycles to determine if a peripheral device is connected in each of the first level plurality of expansion bus slots of the first level EIO expansion bus;
discovering at least one nontransparent expansion bus bridge in at least one of the first level plurality of expansion bus slots of the first level EIO expansion bus, the at least one nontransparent expansion bus bridge emulating a transparent bridge;
generating a set of second level configuration cycles on a second level plurality of expansion bus slots of a second level expansion bus of the printer using a configuration cycle generation method within the at least one nontransparent expansion bus bridge which emulates a transparent expansion bus configuration cycle on the second level expansion bus before determining whether any remaining first level plurality of expansion bus slots of the first level EIO expansion bus are connected to a peripheral device or an additional expansion bus bridge; and
using the set of second level configuration cycles to determine if a peripheral device is connected in each of the second level plurality of expansion bus slots of the second level expansion bus.

14. The method of claim 13, further comprising:
discovering at least one additional expansion bus bridge in at least one of the second level plurality of expansion bus slots;
generating a set of third level configuration cycles on a third level plurality of expansion bus slots using a configuration cycle generation method within the at least one additional expansion bus bridge, wherein the configuration cycle generation method further comprises:
storing a desired configuration address in an address register; and
accessing a data register; and
using the set of third level configuration cycles to determine if a peripheral device is connected in each of the third level plurality of expansion bus slots.

15. A computer readable medium having computer executable instruction configured to discover an expansion bus topology in a printer, comprising:
generating bus configuration cycles on a first level Enhanced Input/Output (EIO) expansion bus of the printer;
evaluating the bus configuration cycles on the first level EIO expansion bus to determine if a first level peripheral device is present;
if at least one first level peripheral device is present, determining if at least one of the at least one first level peripheral devices is a nontransparent bus bridge device emulating a transparent bus bridge device;
generating bus configuration cycles on a second level expansion bus of the printer by accessing registers in the nontransparent bus bridge device; and
evaluating the bus configuration cycles on the second level expansion bus, prior to evaluating any remainder of the first level EIO expansion bus, to determine if at least one second level peripheral device is present, the second level EIO expansion bus having more than three bus connectors connected thereto.

16. The computer readable medium of claim 15, further comprising:
if the at least one second level peripheral device is present, determining if at least one of the at least one second level peripheral device is a second nontransparent bus bridge device emulating a transparent bus bridge device;
generating bus configuration cycles on a third level expansion bus of the printer by accessing registers in the second nontransparent bus bridge device.

* * * * *